A. E. HOLLEY & O. E. MOTT.
NITRATION PROCESS.
APPLICATION FILED DEC. 5, 1917.

1,297,170.

Patented Mar. 11, 1919.

Inventors:
A. E. Holley
and O. E. Mott
by their attorneys
Baldwin & Wight

UNITED STATES PATENT OFFICE.

ALFRED EWART HOLLEY, OF OLDBURY, AND OWEN EDWIN MOTT, OF WOOLWICH, ENGLAND, ASSIGNORS TO THEMSELVES, AND CHANCE AND HUNT, LIMITED, OF OLDBURY, ENGLAND.

NITRATION PROCESS.

1,297,170.  Specification of Letters Patent.  Patented Mar. 11, 1919.

Application filed December 5, 1917. Serial No. 205,573.

*To all whom it may concern:*

Be it known that we, ALFRED EWART HOLLEY, residing at Chemical Works, Oldbury, England, and OWEN EDWIN MOTT, residing at the Research Department, Royal Arsenal, Woolwich, England, subjects of the King of Great Britain, have invented Improved Nitration Processes, of which the following is a specification.

This invention relates to an improved nitration process especially applicable to the manufacture of tri-nitro-toluene.

According to this invention in a nitration process in which a current of acid and a current of organic matter travel in opposite directions, the liquids are continuously agitated together and continuously separated.

The nitration process is preferably effected in a considerable number of vessels, separation taking place after each agitation, but complete separation may in some cases take place only at the two ends.

The plant may comprise a series of pots, in some cases over eight in number, each pot being provided with an unagitated separation space in direct communication with the agitating vessel or pot.

In the preferred form of plant the flow of the acid and the nitrated body in opposite directions through a series of pots arranged on the same level and a series of separation spaces at the same level as the pots takes place entirely by the head produced in the separation space without pumping or lifting means.

Figure 1:
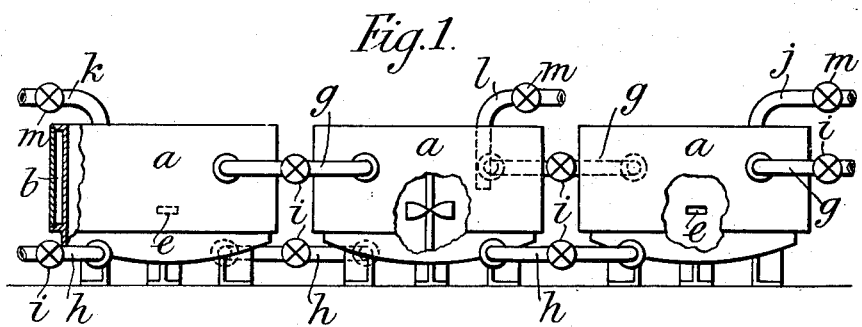
Figure 2:
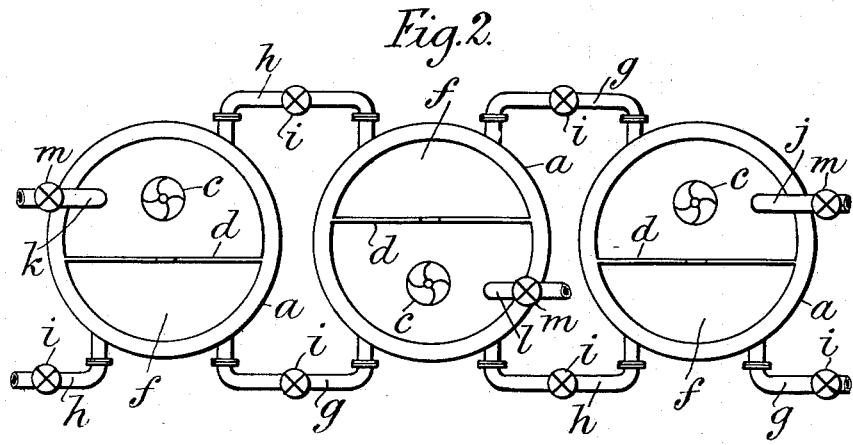

The invention is illustrated in the accompanying drawings in which Figure 1 is an elevation partly in section and Fig. 2 a plan of a plant.

In Figs. 1 and 2, $a$ are pots of cast iron for example, each provided with a jacket $b$ for maintaining it at the desired temperature, stirring gear $c$ and a partition $d$ having at about the center a hole $e$, thus forming a compartment $f$ in direct communication with the agitator portion of the pot.

Each separating compartment $f$ has an outlet pipe $g$ near to the top and an outlet pipe $h$ near to the bottom, leading respectively, except at the two ends of the plant, to the top and bottom of the agitator of the pot on each side of it.

These pipes are fitted with controlling valves $i$ or the flow may be controlled by other means such as plugs located within the pots.

The pots at the two ends of the plant are provided with pipes $j$ $k$ for supplying material on to the surface of the liquid in the agitator portions of the pots.

Some of the intermediate pots are provided with pipes $l$ which extend about half way down the agitator portions of the pots.

The pipes $j$ $k$ $l$ are fitted with controlling valves $m$.

Assuming tri-nitro-toluene is to be made by nitrating mononitrotoluene, and assuming sixteen to be the number of pots employed (although there may be more or fewer), the process may be carried out as follows:—

At a measured rate about 92 to 94% sulfuric acid is fed into pot 16 through the pipe $j$, while mononitrotoluene is introduced at a measured rate on to the surface of the liquid in pot 1, through the pipe $k$, and, as required, nitric acid conveniently in the form of a mixture of approximately 90% nitric acid and 10% sulfuric acid is introduced at measured rates into the pots 4 to 13, or some of them, through pipes $l$.

The stirred mixture in the pots passes through the holes $e$ in the partitions $d$ into the compartments $f$ where it separates into a bottom layer of acid and a top layer of organic material, the acid passing out of the separating compartments, owing to its greater head, through pipes $h$ and controlling valves $i$ into the bottom of the agitator portion of the next pot $a$ in the series, where it is stirred with partially nitrated organic material; acid will in the same way travel through the plant and out of pot 1.

Organic material is delivered as above set out into pot 1 where it is stirred with the acid passing from the separator of pot 2, the mixture of acid and partly nitrated organc matter passing through the hole $e$ in the partition $d$ into the compartment $f$, where the partly nitrated organic matter separates and owing to its head passes through the pipe $g$ and valve $i$ into the agitator portion of pot 2, and so on to pot 16, where it passes out of the plant.

As illustrated, the pots are all on the same level, the flow of acid being obtained by the head of acid in each separator space, while the flow of nitro body is caused by a similar difference of head in the nitro body.

This head may be increased by the use of a pump or other suitable device.

Or the pots may be arranged in cascade, the flow of one liquid then taking place by gravity, the other liquid being raised by a pump or similar means.

Or the flow of the liquids may be effected by first raising the mixture of nitro body and acid by means of a pump or other suitable means to a vessel provided with separating means as above set out, regulated quantities of acid and of nitro body flow thence in opposite directions as stated, any surplus being returned to the vessel from which they were pumped.

Or the process may take place in a vessel of a known type containing a rotating vertical shaft, carrying stirrers in the form of disks in a horizontal plane, spaced between fixed horizontal hollow diaphragms attached to the sides of the vessel and supplied with cooling or heating fluid. The disks may have vanes upon them.

Spaces, however, where there is no stirring are arranged top and bottom to enable acid and organic body to separate.

Fresh acid entering continuously or otherwise at the top, and the organic matter entering at the bottom, react in such a manner that finished nitro-compound flows continuously from the top and spent acid from the bottom.

The plant herein illustrated forms the subject of an application filed on the same date as this application.

What we claim is:—

1. A continuous nitration process in which a current of the organic matter to be nitrated and a current of the acid proceed in opposite directions, the nearly finished product coming into contact with fresh acid while the nearly spent acid comes into contact with the primary material to be nitrated, continuous stirring and continuous separation of the liquids taking place.

2. A continuous nitration process in which acid and material to be nitrated travel in opposite directions through a plant, comprising a plurality of continuously stirred regions each stirred region being in direct communication with an unstirred region.

3. A continuous nitration process in which a current of the organic matter to be nitrated and a current of the acid proceed in opposite directions, the nearly finished product coming into contact with fresh acid while the nearly spent acid comes into contact with the primary material to be nitrated, continuous stirring and continuous separation of the liquids taking place, the numbers of the stirring and separating stages being at least eight.

4. A continuous nitration process in which acid and material to be nitrated travel in opposite directions through a plant, comprising a plurality of continuously stirred regions each stirred region being in direct communication with an unstirred region, the numbers of the stirring and separating stages being at least eight.

5. A continuous nitration process in which sulfuric acid is fed in at one end of the plant and the organic matter to be nitrated at the other end of the plant while nitric acid is fed in at an intermediate stage and in which the current of organic matter and the current of the acids proceed in opposite directions, the nearly finished product coming into contact with fresh acids while the nearly spent acids come into contact with the primary material to be nitrated, continuous separation of the liquids taking place.

6. A continuous nitration process in which sulfuric acid is fed in at one end of the plant and the organic matter to be nitrated at the other end of the plant while nitric acid is fed in at an intermediate stage and in which the acids and the organic matter travel through a plant comprising a plurality of continuously stirred regions each stirred region being in direct communication with an unstirred region.

ALFRED EWART HOLLEY.
OWEN EDWIN MOTT.